INVENTOR
FRED G. HEWITT
BY Thomas J. Nikolai
ATTORNEY

July 18, 1967 F. G. HEWITT 3,332,073

MAGNETIC STORAGE ELEMENTS AND METHOD FOR STORING DISCRETE LEVELS OF DATA

Filed Dec. 27, 1963 6 Sheets-Sheet 2

July 18, 1967 F. G. HEWITT 3,332,073

MAGNETIC STORAGE ELEMENTS AND METHOD FOR STORING DISCRETE LEVELS OF DATA

Filed Dec. 27, 1963

6 Sheets-Sheet 6

United States Patent Office 3,332,073

Patented July 18, 1967

3,332,073

MAGNETIC STORAGE ELEMENTS AND METHOD FOR STORING DISCRETE LEVELS OF DATA

Fred G. Hewitt, St. Paul, Minn., assignor to Sperry Rand Corporation, New York, N.Y., a corporation of Delaware Filed Dec. 27, 1963, Ser. No. 333,873
18 Claims. (Cl. 340—174)

This invention relates in general to memory elements of magnetizable material and in particular to such elements that store discrete levels of data as a function of the degree of the partial switching of the elements' magnetic flux.

The value of the utilization of small cores of magnetizable material as logical memory elements in electronic data processing systems is well known. This value is based upon the bistable characteristic of magnetizable cores which includes the ability to retain or remember magnetic conditions which may be utilized to indicate a binary "1" or a binary "0." As the use of magnetizable cores in electronic data processing equipment increases, a primary means of improving the computational speed of these machines is to utilize memory elements that possess the property of nondestructive readout, for by retaining the initial state of remanent magnetization after readout the rewrite cycle required with destructive readout devices is eliminated. As used herein, the term "nondestructive readout" shall refer to the sensing of the relative directional-state of the remanent magnetization of a magnetizable core without destroying or reversing such remanent magnetization. This should not be interpreted to means that the state of the remanent magnetization of the core being sensed is not temporarily disturbed during such nondestructive readout.

Ordinary magnetizable cores and circuits utilized in destructive readout devices are now so well known that they need no special description herein; however, for purposes of the present invention, it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One technique of achieving destructive readout of a toroidal bistable memory core is that of the well-known coincident current technique. This method utilizes the threshold characteristic of a core having a substantially rectangular hysteresis characteristic. In this technique, a minimum of two interrogate lines thread the core's central aperture, each interrogate line setting up a magnetomotive force in the memory core of one half of the magnetomotive force necessary to completely switch the memory core from a first to a second and opposite magnetic state while the magnetomotive force set up by each separate interrogate winding is of insufficient amplitude to effect a substantial change in the memory core's magnetic state. A sense winding threads the core's central aperture and detects the memory core's substantial or insubstantial magnetic state change as an indication of the information stored therein.

One technique of achieving nondestructive readout of a magnetic memory core is that disclosed in the article "Nondestructive Sensing of Magnetic Cores," Transactions of the AIEE, Communications on Electronics, Buck and Frank, January 1954, pp. 822–830. This method utilizes a bistable magnetizable toroidal memory core having write and sense windings which thread the central aperture, with a transverse interrogate field, i.e., an externally applied field directed across the core's internal flux applied by a second low remanent-magnetization magnetic toroidal core having a gap in its flux path into which one leg of the memory core is placed. Application of an interrogate current signal on the interrogate winding threading the interrogate core's central aperture sets up a magnetic field in the gap which is believed to cause a temporary rotation of the flux of the memory core in the area of the interrogate core's air gap. This temporary alteration of the memory core's remanent magnetic state is detected by the sense winding, the polarity of the output signal indicative of the information stored in the memory core.

Another technique of achieving nondestructive readout of a magnetic memory core is that disclosed in the article "The Transfluxor," Rajchman and Lo, Proceedings of the IRE, March 1956, pp. 321–332. This method utilizes a "transfluxor" which comprises a core of magnetizable material of a substantially rectangular hysteresis characteristic having at least a first large aperture and a second small aperture therethrough. These apertures form three flux paths; the first defined by the periphery of the first aperture, a second defined by the periphery of the second aperture, and a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

One technique of achieving a magnetizable device that may be used in memory or logic applications is that disclosed in the article "The Use of Balanced Magnetic Circuits to Construct Digital Controllers," E. E. Newhall and J. R. Perucca, Proceedings of the 1963 Intermag Conference, April 1963, pp. 10-3-1 to 10-3-6. This method utilizes a multiapertured device of magnetizable material of a substantially rectangular hysteresis characteristic having at least one first relatively long closed flux path—as for example a tubular element of substantial internal diameter, intermediate width and insubstantial thickness—having at least one aperture centrally located therethrough forming a second relatively short closed flux path thereabout—as for example a radial aperture through one wall of the tube—causing the first flux path to be divided into two parallel equal length flux paths. The cross section of the main body of the first flux path is normally equal to the cross section of the first flux path in the area of the radial aperture whereby a saturating drive field coupled to the second path effects a like flux change in the first flux path. As the two parallel flux paths formed out of the first flux path by the radial aperture are of substantially the same length, the flux in the second path may be switched, or reversed, by relatively low amplitude drive fields with the flux in the first flux path merely being tipped, or switched, from a first to a second leg of the second flux path. As the flux in the first flux path is in a balanced relationship with respect to the said first or second legs of the second flux path—i.e., the flux in the first flux path has an equal disposition to pass through such first or second leg of the second flux path—the energy (drive field intensity) required to effect such switching of the flux from the first flux path into said first or second leg is minimal permitting the switching of a relatively large flux by a relatively small drive field. Topologically, a balanced magnetic circuit device is similar to a transfluxor with the limitation that—see the above discussion of the transfluxor—the length of the first flux path defined by the periphery of the large aperture is substantially equal to the third flux path defined by the peripheries of the large and the small apertures. The term "length," unless otherwise specified, when used in describing a flux path shall mean magnetic length and "equal length" implies equal magnetic reluctance.

A still further technique of achieving a nondestructive readout of the magnetic memory core is that disclosed in the article "Fluxlock-High Speed Core Memory," Instruments and Control Systems, Robert M. Tillman, May 1961, pp. 866–869. This method utilizes a bistable magnetic toroidal memory core having write sense windings threading the core's central aperture and an interrogate winding wound about the core along a diameter of the core. Information is stored in the core in the conventional manner. Interrogation is achieved by coupling an interrogate current signal to the interrogate winding causing a temporary alteration of the core's magnetic state. Readout of the stored information is achieved by a bipolar output signal induced in the sense winding the polarity phase of the readout signal indicating the information stored therein.

One method of achieving a decreased magnetic core switching time is to employ time-limited switching techniques as compared to amplitude-limited switching techniques. In employing the amplitude-limited switching technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a steady-state condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on read-out of the stored data. Also, where the final core flux density level is limited solely by the amplitude of the applied drive field, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is less than the flux density of the second stable state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article "Flux Distribution in Ferrite Cores under Various Modes of Partial Switching," R. H. James, W. M. Overn and C. W. Lundberg, Journal of Applied Physics, Supplement, vol. 32, No. 3, pp. 38S–39S, March 1961, provides excellent background material for the switching technique utilized in the present invention.

The magnetic conditions and their definitions as discussed above may now be itemized as follows:

*Partial switching*

*Amplitude-limited.*—Condition wherein with a constant drive field amplitude, increase of the drive field duration will cause no appreciable increase in core flux density.

*Time-limited.*—Condition wherein with a constant drive fluid amplitude, increase of the drive field duration will cause appreciable increase in core flux density.

*Complete switching*

*Saturated.*—Condition wherein increase of the drive field amplitude and duration will cause no appreciable increase in core flux density.

*Stable-state.*—Condition of the magnetic state of the core when the core is not subjected to a variable magnetic field or to a variable current flowing therethrough.

The preferred embodiment of the present invention is concerned with the establishment of a predeterminably variable magnetic flux level in a multiflux path magnetizable memory device which flux level is representative of the amplitude of an incremental portion of a transient electrical signal. In the preferred embodiment an incremental portion of a constant current source type transient signal is gated into a first flux path of the magnetic device by a constant current source type strobe pulse which is coupled to a second flux path which forms two equal flux paths with the first flux path. The maximum amplitude of the transient signal is limited to a level well below the switching threshold of the magnetic device's first flux path such that the transient signal alone is incapable of effecting the flux level of the magnetic device's first flux path. The strobe pulse is of an amplitude sufficient to switch the flux state of the magnetic device from a first saturated state to a second and opposite saturated state but is of such a limited duration so as to preclude such complete flux reversal. However, such duration is sufficient to set the flux level in an intermediate time-limited substantially demagnetized flux state. Different incremental portions of the transient signal may be gated into the magnetic device's first flux path by delaying the transient signal different time increments with respect to the strobe pulse; each different time delayed increment of the transient signal is gated by the strobe pulse into a separate magnetic device so that each separate magnetic device stores a flux level representative of the net magnetomotive fore effect of the strobe pulse and that portion of the transient signal gated by the strobe pulse. The terms "signal," "pulse," etc., when used herein shall be used interchangeably to refer to the concurrent signal that produces the corresponding magnetic field and to the magnetic field produced by the corresponding current signal.

Accordingly, it is a primary object of the present invention to provide a device and a method for the sampling of a constant current source transient electrical signal.

It is a further object of the present invention to provide a device and a method for the flux gating of an incremental portion of a constant current source transient electrical signal by a constant current source time-limited strobe pulse.

It is a further object of the present invention to provide a device and a method whereby an analog signal is sampled by a strobe pulse wherein the duration of the sample portion of the analog signal is determined by the duration of the strobe pulse.

It is a further and more general object of the present invention to provide a novel method of operating a magnetic memory element as an analog signal sampling device.

These and other more detailed and specific objects will be disclosed in the course of the following specification, reference being had to the accompanying drawings, in which.

Figure 11:
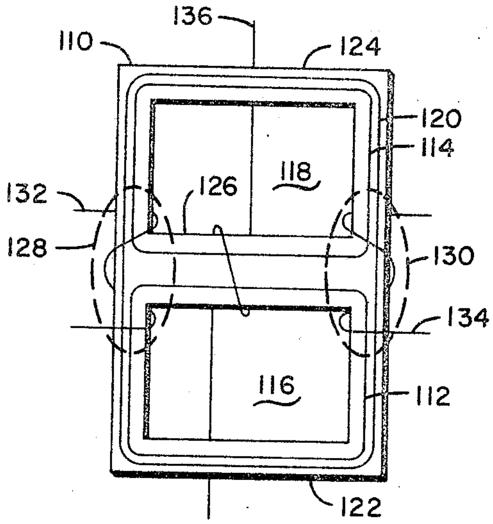
FIG. 11 is an illustration of the details of the two-aperture element of FIG. 9.
Figure 12B:
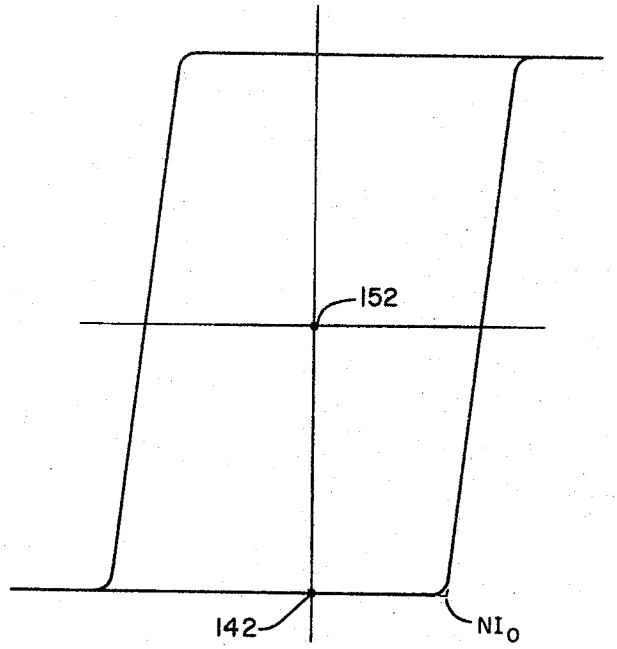
Figure 12A:
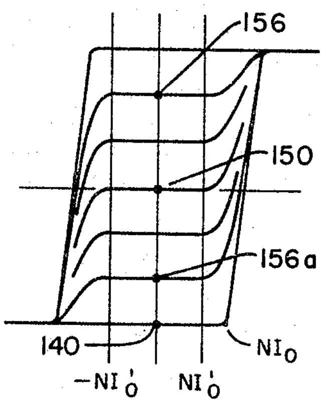
Figure 12C:
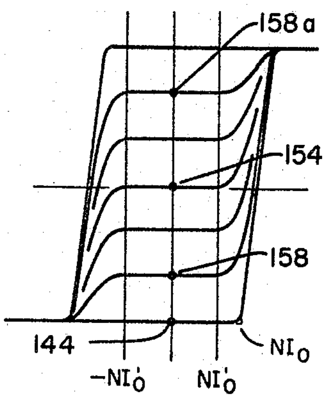

FIGS. 12*a*, 12*b*, 12*c* are the illustrations of the residual magnetization curves of the noted legs of the element of FIG. 11.

Figure 13A:
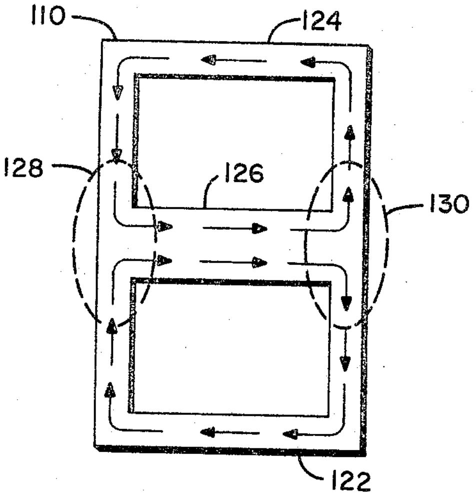
Figure 13B:
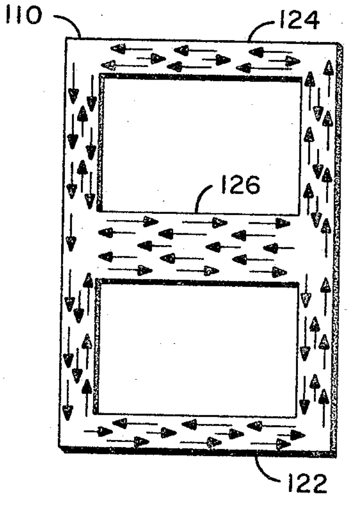

FIGS. 13*a* and 13*b* are schematic illustrations of the flux orientations of the element of FIG. 11 for a clear and a storage state, respectively.

Figure 14:
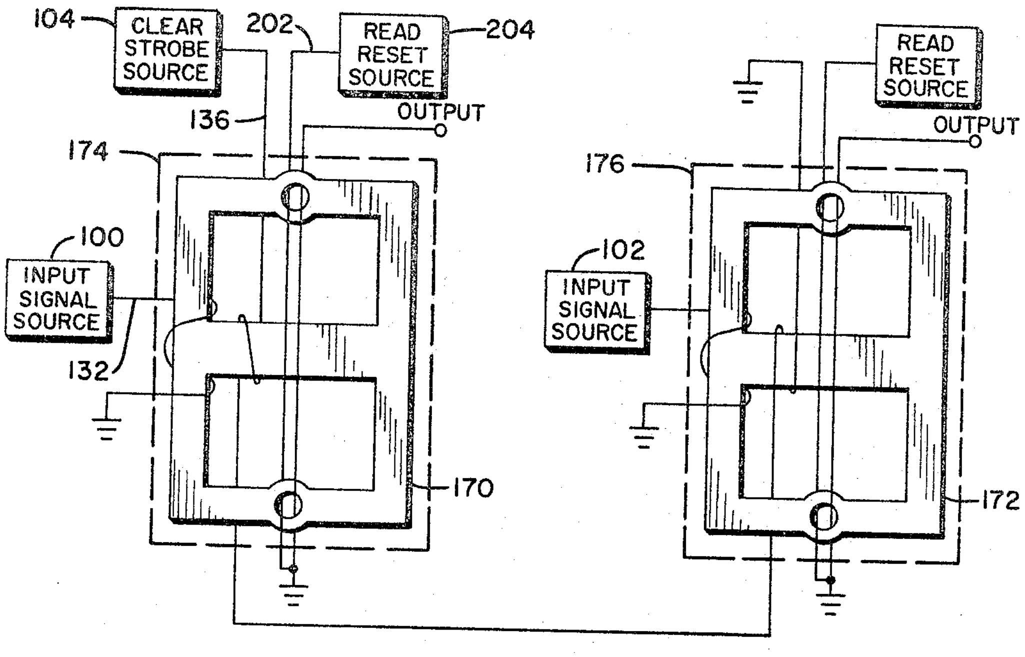

FIG. 14 is an illustration of a second preferred embodiment of the present invention using the elements of FIG. 11 modified to provide nondestructive readout of the information stored therein.

Figure 15:
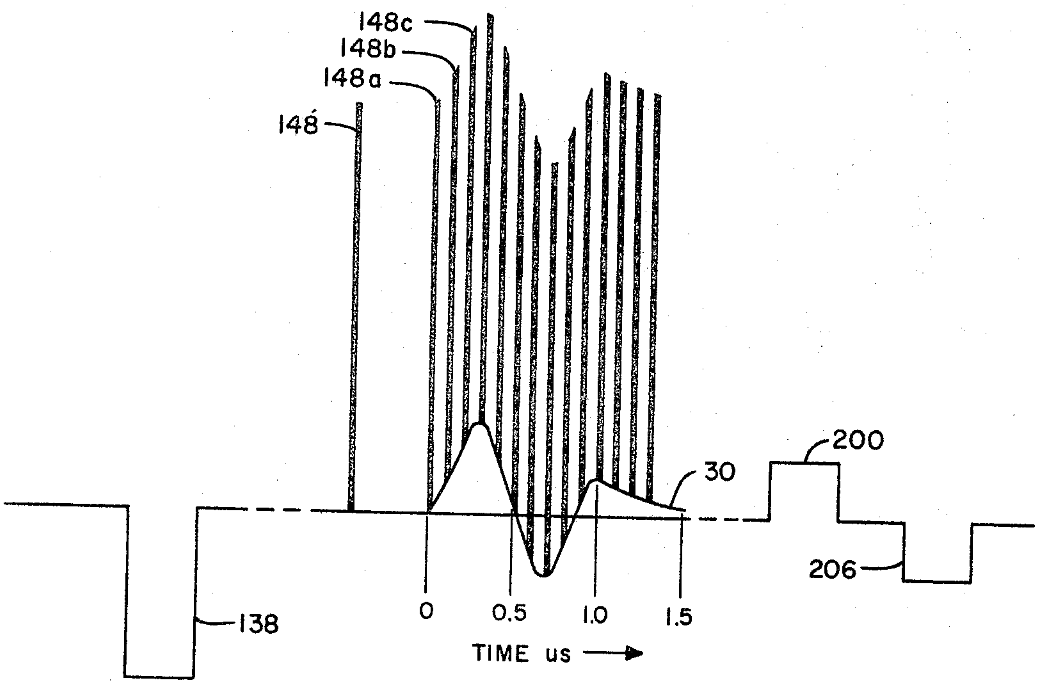

FIG. 15 is an illustration of the control signals associated with the embodiment of FIG. 14.

Figure 16:
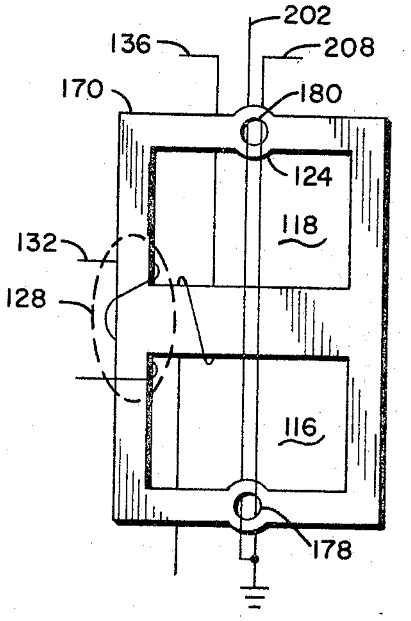

FIG. 16 is an illustration of the details of the two-aperture element of FIG. 11 as modified to provide nondestructive readout of the information stored therein.

To better understand a novel aspect of the present invention, a discussion of a constant current source driving signal as opposed to the use of a constant voltage source driving signal is presented.

Figure 1:
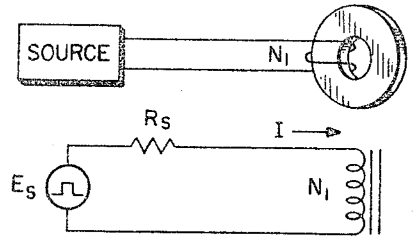
FIG. 1 is an illustration of the general circuit and its equivalent schematic of a source driving a toroidal ferrite core.

A constant voltage source is a source whose output voltage level is independent of the applied load while a constant current source is a source whose output current level is independent of the applied load. FIG. 1 illustrates the general circuit of a source driving a toroidal ferrite core with its equivalent circuit:

$E_s$=source voltage
$R_s$=source internal resistance
$N_1$=number of turns in the coil about the core
$I$=current flowing through the coil about the core This circuit may be defined mathematically by Equation 1

$$E_s=IR_s-N\frac{d\phi}{dt} \qquad (1)$$

with it being assumed that the core is always initially in its negative saturated state and that the drive signal from the source drives the magnetic state of the core toward its positive saturated state. If $R_s$ is made small, Equation 1 reduces to Equation 2.

$$E_s\cong -N\frac{d\phi}{dt} \qquad (2)$$

Therefore by making $R_s$ small the conditions of a constant voltage source are fulfilled. Since $E_s$ and N are constants, $d\phi/dt$ is also a constant, and consequently the flux reversal is a linear function of time.

$$\int_{-\phi_s}^{\pm\phi_1} d\phi=\frac{E_s}{N_1}\int_0^t dt$$

$$\phi_s-\phi_1=\frac{E_s t}{N_1} \qquad (3)$$

For a complete flux reversal the integral, taken from $-\phi_s$ to $+\phi_s$, is (with $T_s$=time required for a complete flux reversal from $-\phi_s$ to $+\phi_s$)

$$\int_{-\phi_s}^{+\phi_s} d\phi=\frac{E_s}{N_1}\int_0^{T_s} dt$$

$$2\phi_s=\frac{E_s T_s}{N_1} \qquad (4)$$

The voltage E induced in any coil about the core is (with $N_2$=the number of turns of a second coil on the core)

$$E=\frac{E_s N_2}{N_1}=\frac{2\phi_s}{T_s}N_2$$

Figure 3:
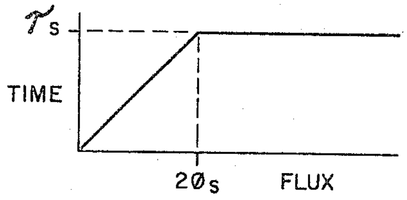
FIG. 3 is an illustration of the plot of flux versus time of the core of FIG. 2.
Figure 2:
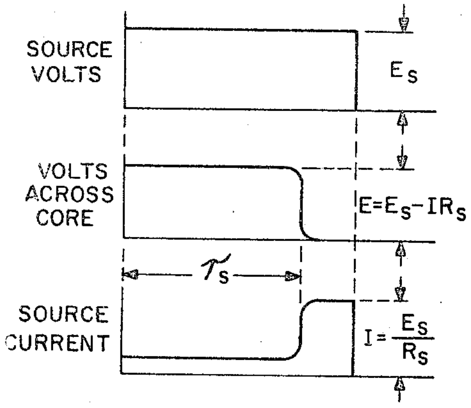
FIG. 2 is an illustration of the resulting voltages and currents of the circuit of FIG. 1 when driven by a constant voltage source.

The resulting voltages and currents under constant voltage source conditions are illustrated in FIG. 2, Equations 3 and 4 show that a plot of flux $\phi$ versus time would be as illustrated in FIG. 3. It is under these constant voltage source conditions that a toroidal ferrite core can be used as a counter, integrator or accumulator. See Patent Nos. 2,968,796 and 2,808,578 for typical uses of this principle of a constant voltage source. It is to be noted that the linear relationship of the plot of flux $\phi$ versus time over the range of $0<\phi<2\phi_s$ as illustrated in FIG. 3 is due to the characteristics of the constant voltage source rather than those of the core.

If $R_s$ is made large, Equation 1 reduces to Equation 5.

$$E_s\cong IR_s \qquad (5)$$

Figure 4:
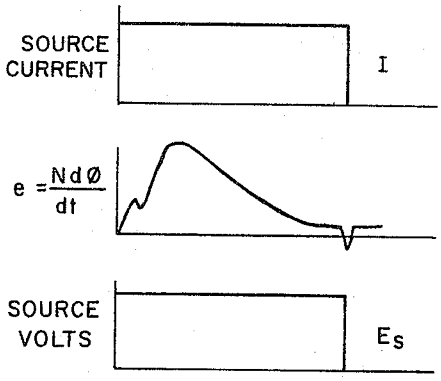
FIG. 4 is an illustration of the resulting voltages and currents of the circuit of FIG. 1 when driven by a constant current source.

Therefore, by making $R_s$ large, the conditions of a constant current source are fulfilled. From inspection of Equation 5 it is apparent that the constant current source has an insignificant effect on the flux reversal or the rate of flux reversal in the core. Under these conditions the flux reversal can be thought of as the intrinsic magnetic behavior of the core with the resulting voltages and currents under constant current source conditions as illustrated in FIG. 4. It is under these constant current source conditions that this present invention is concerned.

Figures 5, 6:
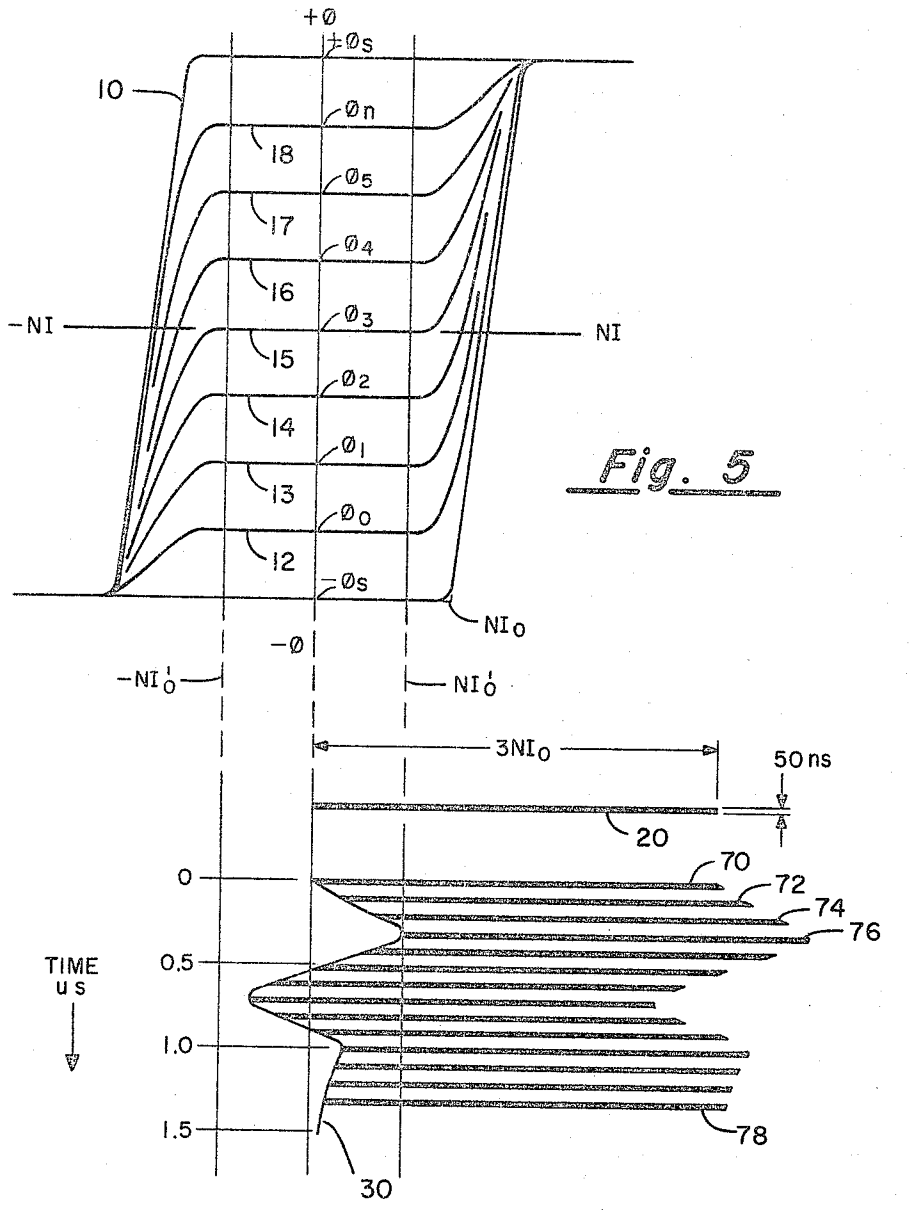
FIG. 5 is an illustration of the residual magnetization of the legs of the balance flux paths of the magnetic device of the preferred embodiment of FIG. 9 utilizing the time-limited different-amplitude flux sampling strobe pulses of the present invention.
FIG. 6 is an illustration of a plot of a series of varying delayed strobe pulses upon a transient signal.

A phenomenological understanding of a time-limited flux state in a toroidal core, or the flux path about an aperture in a plate of magnetizable material such as a transfluxor, can be obtained by considering the flux distribution therethrough. The switching time $\tau_s$, or the time required for complete flux reversal from a first flux saturated state to a second and opposite flux state is given as follows:

$$\tau_s=\frac{S_w}{H-H_0}=\frac{S_w'}{NI-NI_0}$$

where $r$=radius of toroidal core
$\tau_s$=switching time
$I$=current in amperes
$Sw$=material constant
$N$=number of turns
$H$=applied field in oe. (oersteds)$=NI/5r$
$H_0$=switching threshold in oe.$=NI_0/5r$
$Sw'=Sw\ 5r$ Since the applied field H is inversely proportional to the radius of the core, flux reversal takes place faster in an inside ring of the core than in an outside ring of the core. Applying a time-limited drive field to the core results in a flux reversal distribution which decreases with increase in radial distance. That portion of the core which is in a partial switched state exhibits magnetic properties which are similar to a demagnetized state except for the asymmetry as illustrated in FIG. 5. The amount of asymmetry and the shape of the curve for a time-limited state are functions of both the drive field amplitude and duration.

With particular reference to FIG. 5 there is illustrated a residual magnetization curve 10 of the legs of the balanced flux paths of the magnetic device utilized by the present invention. Curve 10 is a plot of the irreversible flux $\phi$ versus the applied magnetomotive force NI where the duration of the current pulse is always greater than the switching time $\tau_s$ of the core, e.g., the applied field is of a sufficient duration to switch the magnetic state of the core from a first saturated remanent magnetic state, such as $-\phi_s$, into a second and opposite saturated remanent magnetic state, such as $+\phi_s$.

Curves 12–18 are the residual magnetization amplitude-limited curves from the respective time-limited stable-states $\phi_0-\phi_n$. As noted before, this time-limited partially-switched stable-state is obtained by terminating the saturating drive field current pulse before the flux reversal, as an example movement of the flux state from $-\phi_s$ to $+\phi_s$, has been completed. Then by applying drive field current pulses of different amplitudes and of a duration greater than the longest $\tau_s$ a family of curves 12–18 is obtained.

In the particular application of applicant's illustrated embodiment there is utilized a strobe pulse 20 (see FIG. 6) which is of a sufficient amplitude but of insufficient duration to switch the magnetic state of the coupled core from $-\phi_s$ to $+\phi_s$. This strobe pulse 20 is obtained from a constant current source and it limited in duration, e.g., time-limited, so as to set the magnetic state of the core in the flux state $\phi_0$ of curve 12. Any increase in the amplitude of pulse 20 causes the magnetic state of the coupled core to be set into a different greater flux state such as $\phi_1-\phi_n$ associated with curves 13–18, respectively.

Figure 7:
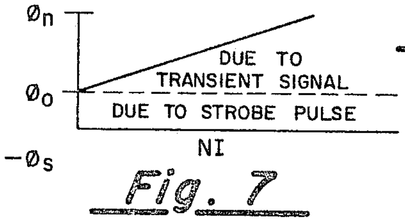
FIG. 7 is an illustration of the linearity of the plot of applied drive field and induced flux in a magnetizable memory element when operating from a constant current source as disclosed by the present invention.

With particular reference to FIG. 7 there is illustrated the linear relationship, over the range $\phi_0-\phi_n$, of the stable-state flux level and the strobe pulse amplitude. In applicant's present invention this variation of the strobe pulse amplitude is achieved by the concurrent action of a constant amplitude strobe pulse and a variable amplitude transient signal. Accordingly, the change in flux level is a linear function of that portion of the transient signal that is concurrent in time with and gated by the strobe pulse.

The present invention is concerned with a detector for and a method of sampling a transient current signal using the partial switching of a magnetic device. With particular reference to FIG. 6 there is illustrated a typical bipolar transient signal 30 that is to be sampled at any one or a plurality of times. Signal 30 is assumed to originate in a constant current source and is, in this embodiment, a bidirectional signal whose maximum NI as regards the legs of the balanced flux paths of the coupled magnetic device is less than $NI_0'$, the switching threshold thereof.

Figure 8:
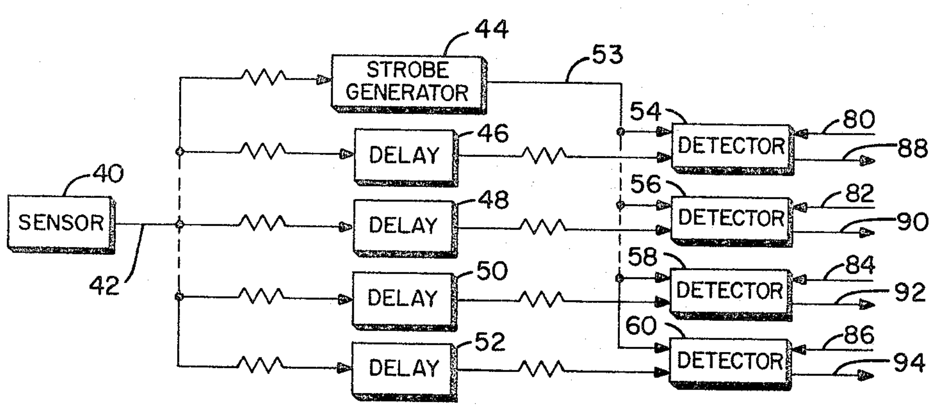
FIG. 8 is an illustration of a system providing the series of varying delayed strobe pulses and transient signal relationships of FIG. 6.

With particular reference to FIG. 8, there is illustrated a diagram of a system whereby such sampling may be accomplished. Assume that the sensor 40 detects a transient phenomenon such as a nuclear weapon burst whose radiation intensity versus time characteristic is defined by signal 30. Signal 30 is coupled to line 42 which in turn couples signal 30 to parallel arranged strobe-generator 44 and delays 46, 48, 50 and 52. Delays 46, 48, 50 and 52 may each delay signal 30 an appropriate time such as D, 3D, 5D and 7D, respectively, and accordingly strobe-generator 44, after a delay 7D, equal to the longest delay provided by the parallel arranged delays 46, 48, 50 and 52, would emit strobe pulse 20 which is simultaneously coupled by way of conductor 53 to detectors 54, 56, 58 and 60. Strobe pulse 20 acts as a constant current source flux gate gating into detectors 54, 56, 58 and 60 that portion of signal 30 that is concurrent with pulse 20. Accordingly, delay 52 having the same delay as strobe generator 44 would sample the wave front of signal 30 over the duration of strobe pulse 20 while delays 50, 48 and 46 would sample signal 30 beginning at delays of 2D, 4D and 6D, respectively, over the duration of strobe pulse 20. As the present invention utilizes strobe pulse 20 as a flux gate to the sampled portion of signal 30 the information stored in detectors 54, 56, 58 and 60 would be the net effect of the magnetomotive force of strobe pulse 20 and that magnetomotive force of that concurrent portion of signal 30 from the various delays 46, 48, 50 and 52. As an example: in detector 60 the greatest delayed signal 30 of 7D is gated by the delayed strobe signal 20 of 7D to sample the leading edge of signal 30 as at pulse 70 of FIG. 6; in detector 58 the next greater delayed signal 30 of 5D is gated by the delayed strobe signal 20 of 7D to sample signal 30 at a delay of 2D as at pulse 72; in detector 56 the next greater delayed signal 30 of 3D is gated by the delayed strobe signal 20 of 7D to sample signal 30 at a delay of 4D as at pulse 74; while in detector 54 the least delayed signal 30 of D is gated by the delayed strobe signal 20 of 7D to sample signal 30 at a delay of 6D as at pulse 76.

As an example, assume that the system of FIG. 8 contains $n=14$ serially arranged delay-detector sets, such as the set formed by delay 46-detector 54, that strobe pulse 20 is 50 ns. (nanoseconds) or 1D in duration and that each delay-detector set delayed signal 30 an additional increment 2D of 100 ns., i.e., the longest delay is $(2n-1)D$ or 27D or 1.35 $\mu$s. (microseconds). Strobe-generator 44 would emit a strobe pulse 20 at a time 1.35 $\mu$s. after the coupling of signal 30 thereto causing the wave front of signal 30 to be sampled by the delay-detector set having the longest and similar delay as at pulse 70. The delay-detector sets having the progressively less delay of signal 30 would have progressively delayed samples of signal 30 as at pulses 72, 74, 76, etc., until the delay-detector set having the least delay of signal 30 would have the greatest delayed sample of signal 30 as at pulse 78. At this time the fourteen detectors would each have stored therein discrete levels of flux, each level indicative of the amplitude of the sampled portion of signal 30. Subsequent to the sampling procedure outlined above, the information stored in each detector could be read out by coupling a read, or interrogate, signal thereto as at readout means 80, 82, 84 and 86 causing an output signal representative of the flux level stored in each detector to be coupled to the output means 88, 90, 92 and 94 of detectors 54, 56, 58 and 60, respectively.

Figure 9:
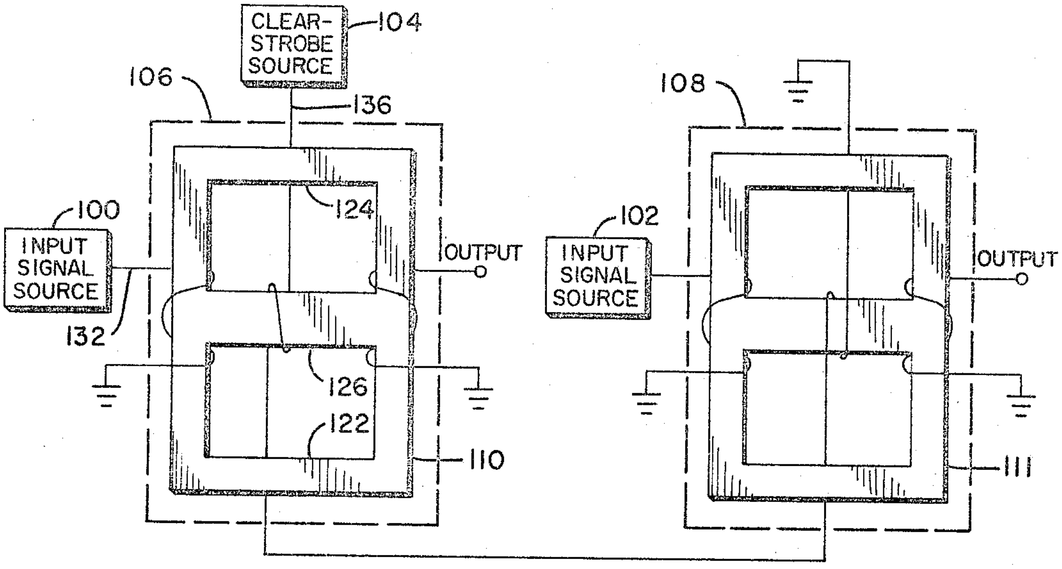
FIG. 9 is an illustration of a preferred embodiment of the present invention using two-aperture elements as the magnetizable memory elements.
Figure 10:
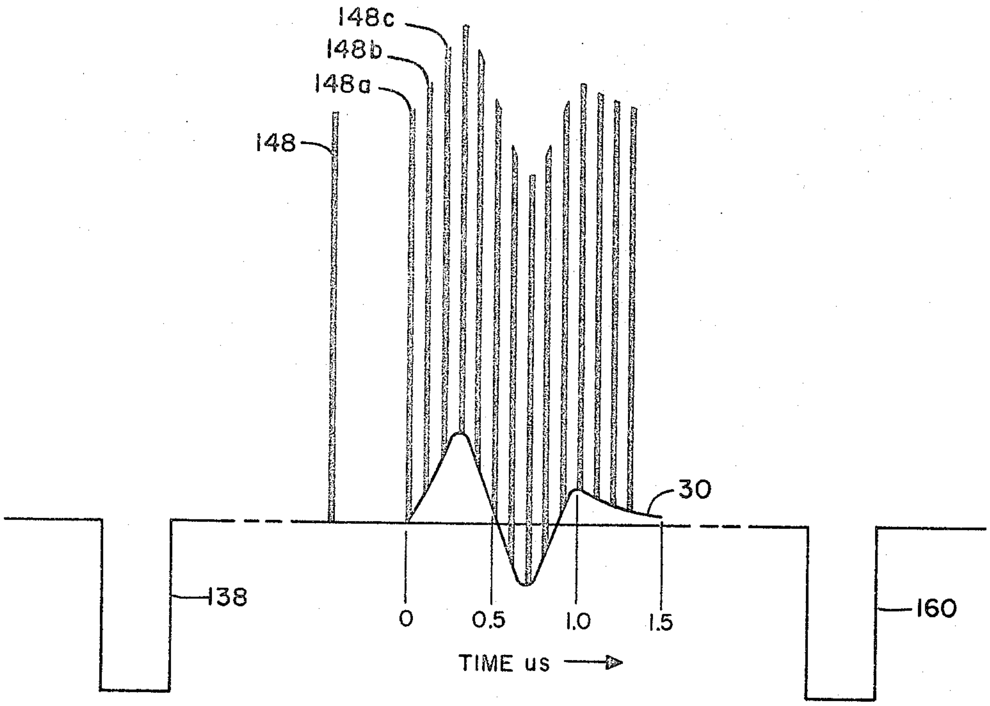
FIG. 10 is an illustration of the control signals associated with the embodiment of FIG. 9.

With particular reference to FIGS. 9, 10 and 11, there is disclosed a preferred embodiment of the present invention wherein the detectors are two-aperture elements providing destructive readout of the information stored therein. Input signal sources 100 and 102 could be any constant current transient signal source but here are analogous to delays 46 and 52 while clear-strobe source 104 is analogous to strobe generator 44 and detectors 106 and 108 are analogous to detectors 54 and 60 of FIG. 8.

Detector 106 is comprised of a two-aperture element 110 of magnetizable material and is more fully detailed in FIG. 11. Element 110 has, as does element 111 of detector 108, two balanced, or equal, flux paths 112 and 114 each path defined by the peripheries about the respective apertures 116 and 118 and a third flux path 120 defined by the periphery about both apertures 116 and 118. Legs 122 and 124 of paths 112 and 114, respectively, are of equal cross sectional area and jointly are equal to the cross sectional area of leg 126 forming flux paths of equal reluctance and of similar magnetic characteristics. Additionally, paths 112, 114 and 120 merge at two junctions 128 and 130 forming flux areas that are coupled to the input conductor 132 and the output conductor 134, respectively, while leg 126 forms the flux area to which the clear-strobe conductor 136 couples the clear-strobe signal from clear-strobe source 104.

Preparatory to the sampling operation element 110 is initially set into a clear state by a coupling of clear pulse 138 (see FIG. 10) to conductor 136 by clear-strobe generator 104. In this initial clear condition legs 122, 126 and 124 are set into negative, substantially-saturated remanent magnetic stable-states denoted as points 140, 142 and 144 of FIGS. 12*a*, 12*b* and 12*c*, respectively. FIG. 13*a* is a schematic illustration of the flux orientation in legs 122, 126 and 124 of element 110 at this time. Next, for the sampling operation transient signal 30 is coupled to conductor 132—as stated previously signal 30 is of an insufficient amplitude-duration characteristic to individually effect the initial magnetic state of any of the legs of element 110—concurrently with the relatively delayed coupling of strobe pulse 148 to leg 126. Strobe pulse 148 functions as a flux gate to that portion of signal 30 that is concurrent therewith. As stated previously strobe pulse 148 is of an amplitude-duration characteristic sufficient to switch the flux state of all of the paths of element 110 from their initial negative substantially-saturated remanent magnetic stable-states into opposite positive, substantially-saturated remanent magnetic stable-states but is of such a limited duration so as to preclude such complete flux reversal. However, such duration is sufficient to set the flux level in legs 122, 126 and 124 into substantially-demagnetized remanent magnetic stable-states such as points 150, 152 and 154, respectively, of FIGS. 12*a*, 12*b* and 12*c*, respectively. However, signal 30 due to its manner of coupling paths 112, 114 and 120 couples to path 120 in the area of junction 128 a field whose direction and amplitude produces a corresponding unbalance in the flux levels in legs 122 and 124 but has substantially no effect upon the flux level of leg 126. Assuming a positive sampled portion of signal 30 of the proper amplitude there is a counter-clockwise unbalancing flux induced into path 120 which causes the flux levels of legs 122 and 124 to assume the unbalanced remanent magnetic stable-states represented by points 156 and 158, respectively, of FIGS. 12*a* and 12*c*, respectively. Such flux levels, due to the magnetic symmetry of legs 122 and 124, are symmetrically displaced about their demagnetized states 150 and 154, respectively. Element 108 is now in its associated storage state and the flux orientations in legs 122, 126 and 124 are as schematically illustrated in FIG. 13*b*.

Readout of the information stored in element 108—that information is the polarity and magnitude of the sampled portion of signal 30—is accomplished by the coupling of readout signal 160 to conductor 136 by clear-strobe source 104. Signal 160 is of an amplitude-duration characteristic sufficient to place legs 122, 124 and 126 back into their initial negative substantially-saturated remanent magnetic stable-states of points 140, 142 and 144, respectively, of FIGS. 12*a*, 12*b* and 12*c*, respectively. The switching of the flux levels in leg 122 from point 156 to point 140 and in leg 124 from point 158 to point 144 generates in the area of junction 130 a magnetic field that is coupled to conductor 134 inducing therein a signal whose amplitude and polarity are representative of the amplitude and polarity of the sampled portion of signal 30 that had been previously stored in element 110 of detector 106. It is apparent that a negative, sampled portion of signal 30 of the same amplitude as the above discussed positive sampled portion would have the opposite unbalancing effects in legs 122 and 124 so as to cause the flux levels of legs 122 and 124 to assume the opposite unbalanced remanent magnetic stable-states represented by points **156*a* and 158*a***, respectively, of FIGS. 12*a* and 12*c*, respectively. Such reversed flux levels would upon readout induce in conductor 134 a signal whose amplitude is equal to that produced by the positive sampled portion but of the opposite polarity.

As with the above described operation of the system of FIG. 8 the signals from sources 100 and 102 could be signal 30 delayed various delay times while the strobe pulse 148 could be delayed, preferably, at least as long as the longest delay of signal 30. As illustrated in FIG. 10 with the use of fourteen detectors, such as detectors 106 and 108, and fourteen input sources, such as input sources 100 and 102, a first input source delaying signal 30 a time $D=50$ ns. and each other input source providing a delay of an additional $2D=100$ ns. and with strobe pulse 148 being delayed an amount equal to the greatest delay of 1.35 $\mu$s., the successive magnetomotive forces of pulses **148*a*, 148*b*, 148*c*, etc., would be coupled to the detectors 106, 108, etc., at successively increasing delay times with respect to the wave front of signal 30**.

With particular reference to FIGS. 14, 15 and 16 there is disclosed another embodiment of the present invention wherein elements 170 and 172 of detectors 174 and 176, respectively, are similar to those of FIG. 9 except—see FIG. 16—for the addition of apertures 178 and 180 in legs 122 and 124, respectively, and the necessary accomodating revisions. As the method of operation of the detectors of FIG. 14 is similar to that of the detectors of FIG. 9 except for the readout operation such similar operation shall not be repeated here. Accordingly, elements and signals of FIGS. 9 and 14 having the same function bear the same reference number.

Readout of the information stored in element 170 is accomplished by the coupling of read signal 200 to conductor 202 by read-reset source 204. Signal 200 is of an amplitude-duration characteristic sufficient to place the flux in the flux paths defined by the peripheries of apertures 178 and 180 in a substantially saturated counter-clockwise stable-state if the flux about such apertures is in an at least partially unblocked state thereto as the term "unblocked state" is known in conventional transfluxor operation. Read signal 200 switches the flux about such apertures 178 and 180 inducing an output signal in conductor 208 which threads apertures 178 and 180 in opposite magnetic senses as compared to conductor 202 which threads apertures 178 and 180 in the same magnetic sense. The output signal induced in conductor 208 is a signal corresponding to the flux unbalance in legs 122 and 124 of element 170 due to the difference of the remanent stable-states of legs 122 and 124, as for example, represented by points 156 and 158, respectively, of FIGS.

12a and 12c, respectively. As element 170 stores bipolar signals it is apparent that as in the embodiment of FIG. 9, the output signal may be a positive or negative output signal of differing amplitudes depending upon the relative magnitude and direction of the unbalance of the flux levels of legs 122 and 124. This readout procedure provides nondestructive readout of the information stored in detector 174 as is expected with typical transfluxor readout.

After the readout operation read-reset source 204 couples to conductor 202 reset pulse 206, which has the same wave form characteristic as does read pulse 200 but of the opposite polarity, and which is coupled to the small apertures of element 170. Reset pulse 206 resets the flux reversed by the readout pulse 200 setting the flux states about apertures 178 and 180 back into their informational state prior to the readout operation. Subsequent coupling of readout pulse 200-reset pulse 206 to conductor 202 provides nondestructive readout on conductor 208 to the information stored in detector 174.

As with the above discussed operation of the system of FIG. 8, the signals from sources 100 and 102 could be signal 30 delayed various delay times while the strobe pulse 148 could be delayed preferably at least as long as the longest delay of signal 30. As illustrated in FIG. 8 with the use of fourteen detectors, such as detectors 174 and 176, and fourteen associated input sources such as input sources 100 and 102 a first input source delaying signal 30 a time $D=50$ ns. and each other input source providing a delay of an additional 100 ns. and with strobe pulse 148 being delayed an amount equal to the greatest delay of 1.35 $\mu$s. the successive magnetomotive forces of pulses 148a, 148b, 148c, etc., would be gated into detectors 174, 176, etc., at successively increasing delay times with respect to the wave front of signal 30.

It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims.

What is claimed is:

1. A magnetic device, comprising:

a magnetizable memory element having three parallel arranged legs joined at first and second junctions;

each of said legs forming closed flux paths with each other and having a substantially rectangular hysteresis characteristic and being capable of being operated in a time-limited, an amplitude-limited or a saturated condition as a function of a magnetic field of a predetermined amplitude-duration characteristic;

first and second of said legs each forming equal flux paths with said third leg;

clear signal means for inductively coupling to said third leg in a first magnetic sense a saturating clear signal for placing said first, second and third legs in initial negative substantially-saturated remanent magnetic stable-states;

strobe signal means for inductively coupling to said third leg in a second magnetic sense opposite to said clear signal a constant-current source time-limited relatively short duration strobe signal;

said strobe signal having a sufficient amplitude-duration characteristic to cause said first, second and third legs to be placed into a substantially-demagnetized remanent magnetic stable-state from said initial stable-state;

transient signal means for inductively coupling a constant-current source relatively long duration transient signal to said first junction;

said transient signal having an insufficient amplitude-duration characteristic to effect the initial stable-states of said first, second and third legs;

said strobe signal concurrent with a sampled portion of said transient signal;

output means inductively coupled to said second junction;

said transient signal sampled portion causing an unbalance in the flux levels of the substantially-demagnetized stable-states of said first and second legs representative of its polarity and amplitude;

read signal means for inductively coupling to said third leg in the same magnetic sense as said clear signal a saturating read signal;

said read signal causing an output signal representative of the flux level unbalance in said first and second legs to be coupled to said output means.

2. A magnetic memory device, comprising:

a magnetizable memory element having at least two apertures forming first and second equal flux paths each defined by the peripheral paths about each of said first and second apertures, respectively;

said first and second flux paths having a substantially rectangular hysteresis characteristic and being capable of being operated in a time-limited, an amplitude-limited or a saturated condition as a function of a magnetic field of a predetermined amplitude-duration characteristic;

a first leg common to said first and second flux paths;

a second leg common to only said first flux path;

a third leg common to only said second flux path;

said first, second and third legs forming first and second junctions at first and second ends of said first leg;

clear signal means for inductively coupling to said first leg in a first magnetic sense a saturating clear signal for placing said first, second and third legs in initial negative substantially-saturated remanent magnetic stable-states;

strobe signal means for inductively coupling to said first leg in a second magnetic sense, opposite to the first magnetic sense of said clear signal, a constant current source time-limited relatively short duration strobe signal;

said strobe signal having a sufficient amplitude-duration characteristic to cause said first, second and third legs to be moved into substantially-demagnetized remanent magnetic stable-states from said initial negative substantially-saturated remanent magnetic stable-states;

transient signal means for inductively coupling to said first junction a constant current source relatively long duration transient field that is additive in one of said first or second legs to the field produced by said strobe signal and subtractive in the other of said first or second legs to the field produced by said strobe signal;

said transient signal having an insufficient amplitude-duration characteristic to substantially effect the magnetic states of said first, second and third legs when in said initial negative substantially-saturated remanent magnetic stable-state;

said strobe signal concurrent with a sampled portion of said transient signal;

output means inductively coupled to said second junction;

said concurrent strobe signal and said transient signal sampled portion causing a flux unbalance in the remanent magnetic stable-states of said second and third legs;

read signal means for inductively coupling to said first leg in the said first magnetic sense of said clear signal a saturating read signal for placing said first, second and third legs back into their initial negative substantially-saturated remanent magnetic stable-states;

said read signal causing an output signal representative of the flux unbalance in said second and third legs to be coupled to said output means.

3. A magnetic memory device, comprising:

a multi-aperture magnetizable memory element having a substantially rectangular hysteresis characteristic and being capable of being operated in a time-limited, an amplitude-limited or a saturated condition as a function of a magnetic field of a predetermined amplitude-duration characteristic;

said element having at least two apertures;

first and second equal flux paths each defined by the peripheral paths about each of said first and second apertures, respectively;

a third flux path defined by the peripheral path about both of said first and second apertures;

a first leg common to said first and third flux paths;

a second leg common to said second and third flux paths;

a third leg common to said first and second flux paths;

said first, second and third legs forming first and second junctions at first and second ends of said third leg;

clear signal means for inductively coupling to said third leg in a first magnetic sense a saturating clear field for placing the flux in said first, second and third legs in an initial negative substantially-saturated remanent magnetic stable-state;

strobe signal means for inductively coupling to said third leg in a second magnetic sense, opposite to said first magnetic sense of said clear signal, a constant current source time-limited relatively short duration strobe signal;

said strobe signal having a sufficient amplitude-duration characteristic to cause said first, second and third legs to be set into a substantially-demagnetized remanent magnetic stable-state from said initial negative substantially-saturated remanent magnetic stable-state;

transient signal means for inductively coupling in a first magnetic sense a constant current source relatively long duration transient signal to said first junction;

said transient signal having an insufficient amplitude-duration characteristic to effect the magnetic state of said first, second and third legs when in said initial negative substantially-saturated remanent magnetic stable-state;

said strobe signal concurrent with a relatively short duration sampled portion of said transient signal;

output means inductively coupled to said third flux path at said second junction for detecting a change in the flux level of said third flux path;

said concurrent sampled portion of said transient signal causing an unbalance in the concurrently produced substantially-demagnetized remanent magnetic stable-states produced in said first and second legs by said strobe signal;

read signal means for inductively coupling to said third leg in said first magnetic sense a saturating read signal for placing the flux in said first, second and third legs back into their initial negative substantially-saturated remanent magnetic stable-state;

said read signal causing a signal representative of the unbalance in the substantially-demagnetized remanent magnetic stable-state produced by said strobe signal as effected by said sampled portion of said transient signal to be coupled to said output means.

4. A magnetic device, comprising:

a magnetizable memory element having three parallel arranged legs joined at first and second junctions;

each of said legs forming closed flux paths with each other and having a substantially rectangular hysteresis characteristic and being capable of being operated in a time-limited, an amplitude-limited or a saturated condition as a function of a magnetic field of a predetermined amplitude-duration characteristic;

first and second of said legs each forming equal flux paths with said third leg;

read signal means for inductively coupling to said third leg in a first magnetic sense a saturating read signal for placing said first, second and third legs in initial negative substantially-saturated remanent magnetic stable-states;

strobe signal means for inductively coupling to said third leg in a second magnetic sense opposite to said read signal a constant-current source time-limited relatively short duration strobe signal;

said stroge signal having a sufficient amplitude-duration characteristic to cause said first, second and third legs to be placed into a substantially-demagnetized remanent magnetic stable-state from said initial stable-state;

transient signal means for inductively coupling a constant-current source relatively long duration transient signal to said first junction;

said transient signal having an insufficient amplitude-duration characteristic to effect the initial stable-states of said first, second and third legs;

said strobe signal concurrent with a sampled portion of said transient signal;

output means inductively coupled to said second junction;

said transient signal sampled portion causing an unbalance in the flux levels of the substantially-demagnetized stable-state of said first and second legs representative of its polarity and amplitude;

said read signal means coupling said read signal to said third leg for causing an output signal representative of the flux level unbalance in said first and second legs to be coupled to said output means.

5. A magnetic memory device, comprising:

a magnetizable memory element having at least two apertures forming first and second equal flux paths each defined by the peripheral paths about each of said first and second apertures, respectively;

said first and second flux paths having a substantially rectangular hysteresis characteristic and being capable of being operated in a time-limited, an amplitude-limited or a saturated condition as a function of a magnetic field of a predetermined amplitude-duration characteristic;

a first leg common to said first and second flux paths;

a second leg common to only said first flux path;

a third leg common to only said second flux path;

said first, second and third legs forming first and second junctions at first and second ends of said first leg;

read signal means for inductively coupling to said first leg in a first magnetic sense a saturating read signal for placing said first, second and third legs in initial negative substantially-saturated remanent magnetic stable-states;

strobe signal and subtractive in the other of said first leg in a second magnetic sense, opposite to the first magnetic sense of said read signal, a constant current source time-limited relatively short duration strobe signal;

said strobe signal having a sufficient amplitude-duration characteristic to cause said first, second and third legs to be moved into substantially-demagnetized remanent magnetic stable-states from said initial negative substantially-saturated remanent magnetic stable-states;

transient signal means for inductively coupling to said first junction a constant current source relatively long duration transient field that is additive in one of said first or second legs to the field produced by said strobe signal and substractive in the other of said first or second legs to the field produced by said strobe signal;

said transient signal having an insufficient amplitude-duration characteristic to substantially effect the magnetic states of said first, second and third legs when in said initial negative substantially-saturated remanent magnetic stable-state;

said strobe signal concurrent with a sampled portion of said transient signal;

output means inductively coupled to said second junction;

said concurrent strobe signal and said transient signal sampled portion causing a flux unbalance in the remanent magnetic stable-states of said second and third legs;

said read signal means coupling said read signal to said first leg for placing said first, second and third legs back into their initial negative substantially-saturated remanent magnetic stable-states;

said read signal causing an output signal representative of the flux unbalance in said second and third legs to be coupled to said output means.

6. A magnetic memory device, comprising:

a multi-aperture magnetizable memory element having a substantially rectangular hysteresis characteristic and being capable of being operated in a time-limited, an amplitude-limited or a saturated condition as a function of a magnetic field of a predetermined amplitude-duration characteristic;

said element having at least two apertures;

first and second equal flux paths each defined by the peripheral paths about each of said first and second apertures, respectively;

a third flux path defined by the peripheral path about both of said first and second apertures;

a first leg common to said first and third flux paths;

a second leg common to said second and third flux paths;

a third leg common to said first and second flux paths;

said first, second and third legs forming first and second junctions at first and second ends of said third leg;

read signal means for inductively coupling to said third leg in a first magnetic sense a saturating clear field for placing the flux in said first, second and third legs in an initial negative substantially-saturated remanent magnetic stable-state;

strobe signal means for inductively coupling to said third leg in a second magnetic sense, opposite to said first magnetic sense of said read signal, a constant current source time-limited relatively short duration strobe signal;

said strobe signal having a sufficient amplitude-duration characteristic to cause said first, second and third legs to be set into a substantially-demagnetized remanent magnetic stable-state from said initial negative substantially-saturated remanent magnetic stable-state;

transient signal means for inductively coupling in a first magnetic sense a constant current source relatively long duration transient signal to said first junction;

said transient signal having an insufficient amplitude-duration characteristic to effect the magnetic state of said first, second and third legs when in said initial negative substantially-saturated remanent magnetic stable-state;

said strobe signal concurrent with a relatively short duration sampled portion of said transient signal;

output means inductively coupled to said third flux path at said second junction for detecting a change in the flux level of said third flux path;

said concurrent sampled portion of said transient signal causing an unbalance in the concurrently produced substantially-demagnetized remanent magnetic stable-states produced in said first and second legs by said strobe signal;

said read signal means coupling said read signal to said third leg for placing the flux in said first, second and third legs back into their initial negative substantially-saturated remanent magnetic stable-state;

said read signal causing a signal representative of the unbalance in the substantially-demagnetized remanent magnetic stable-state produced by said strobe signal as effected by said sampled portion of said transient signal to be coupled to said output means.

7. A magnetic memory device comprising:

a plurality of magnetizable memory elements each having at least two apertures forming first and second equal flux paths each defined by the peripheral paths about each of said first and second apertures, respectively;

said first and second flux paths having a substantially rectangular hysteresis characteristic and being capable of being operated in a time-limited, an amplitude-limited or a saturated condition as a function of a magnetic field of a predetermined amplitude-duration characteristic;

a first leg common to said first and second flux paths;

a second leg common to only said first flux path;

a third leg common to only said second flux path;

said first, second and third legs forming first and second junctions at first and second ends of said first leg;

clear signal means for inductively coupling to said first legs in a first magnetic sense a saturating clear signal for placing said first, second and third legs in initial negative substantially-saturated remanent magnetic stable-states;

strobe signal means for simultaneously inductively coupling to said first legs in a second magnetic sense, opposite to the first magnetic sense of said clear signal, a constant current source time-limited relatively short duration strobe signal;

said strobe signal having a sufficient amplitude-duration characteristic to cause said first, second and third legs to be moved into substantially-demagnetized remanent magnetic stable-states from said initial negative substantially-saturated remanent magnetic stable-states;

transient signal means for inductively coupling to said first junctions at a plurality of delay times with respect to said strobe signal a constant current source relatively long duration transient signal that is additive in one of said first or second legs to the field produced by said strobe signal and subtractive in the other of said first or second legs to the field produced by said strobe signal;

said transient signal having an insufficient amplitude duration characteristic to substantially effect the magnetic states of said first, second and third legs when in said initial negative substantially-saturated remanent magnetic stable-state;

said strobe signal concurrent with a plurality of sampled portions of said transient signal, each sampled portion corresponding to the respective transient signal delay time;

separate output means inductively coupled to said second junction of each element;

said concurrent strobe signal and said transient signal sampled portion causing a flux unbalance in the remanent magnetic stable-states of said second and third legs;

read signal means for selectively inductively coupling to said first legs, in the said first magnetic sense of said clear signal, a saturating read signal for placing said first, second and third legs back into their initial negative substantially-saturated remanent magnetic stable-states;

said read signal causing an output signal representative of the flux unbalance in said second and third legs of each element to be coupled to its respective output means.

8. A magnetic device, comprising:

a plurality of magnetizable memory elements each having three parallel arranged legs joined at first and second junctions;

each of said legs forming closed flux paths with each other and having a substantially rectangular hysteresis characteristic and being capable of being operated in a time-limited, an amplitude-limited or a saturated condition as a function of a magnetic field of a predetermined amplitude-duration characteristic;
first and second of said legs each forming equal flux paths with said third leg;
clear signal means for inductively coupling to the said third legs of said elements in a first magnetic sense a saturated clear signal for placing said first, second and third legs in initial negative substantially-saturated remanent magnetic stable-states;
strobe signal means for simultaneously inductively coupling to the said third legs of said elements in a second magnetic sense, opposite to said clear signal, a constant-current source time-limited relatively short duration strobe signal;
said strobe signal having a sufficiently amplitude-duration characteristic to cause said first, second and third legs to be placed into a substantially-demagnetized remanent magnetic stable-state from said initial stable-state;
transient signal means for selectively inductively coupling a constant-current source relatively long duration transient signal to said first junctions at a plurality of delay times with respect to said strobe signal;
said transient signal having an insufficient amplitude-duration characteristic to effect the initial stable-states of said first, second and third legs;
said strobe signal concurrent with a plurality of sampled portions of said transient signal, each sampled portion corresponding to the respective transient signal delay time;
separate output means inductively coupled to said second junction of each element;
said transient signal sampled portion causing an unbalance representative of its polarity and amplitude from the flux levels of the substantially-demagnetized stable-states of said first and second legs of the respective element;
read signal means for selectively inductively coupling to said third legs of said elements, in the same magnetic sense as said clear signal, a saturating read signal;
said read signal causing an output signal representative of the flux level unbalance in said first and second legs of each respective element to be coupled to its respective output means.

9. A magnetic memory device, comprising:
a plurality of multi-apertured magnetizable memory elements each having a substantially rectangular hysteresis characteristic and being capable of being operated in a time-limited, an amplitude-limited or a saturated condition as a function of a magnetic field of a predetermined amplitude-duration characteristic;
each element having at least two apertures;
first and second equal flux paths each defined by the peripheral paths about each of said first and second apertures, respectively;
a third flux path defined by the peripheral path about both of said first and second apertures;
a first leg common to said first and third flux paths;
a second leg common to said second and third flux paths;
a third leg common to said first and second flux paths;
said first, second and third legs forming first and second junctions at first and second ends of said third leg;
clear signal means for inductively coupling to the third leg of each element in a first magnetic sense a saturating clear signal for placing the flux in said first, second and third legs in an initial negative substantially-saturated remanent magnetic stable-state;
strobe signal means for inductively coupling to said third leg in a second magnetic sense, opposite to said first magnetic sense of said clear signal, a constant current source time-limited relatively short duration strobe signal;
said strobe signal having a sufficient amplitude-duration characteristic to cause said first, second and third legs to be set into a substantially-demagnetized remanent magnetic stable-state from said initial negative substantially-saturated remanent magnetic stable-state;
transient signal means for inductively coupling in a first magnetic sense a plurality of similar constant current source relatively long duration transient signals, each signal to a separate one of said first junctions of each of said elements at a unique delay time with respect to said strobe signal;
said transient signal having an insufficient amplitude-duration characteristic to effect the magnetic state of said first, second and third legs when in said initial negative substantially-saturated remanent magnetic stable-state;
said strobe signal concurrent with a relatively short duration sampled portion of said transient signals;
separate output means inductively coupled to each of said third flux paths at said second junction for detecting a change in the flux level of said third flux path;
said concurrent sampled portion of said transient signal causing an unbalance in the substantially-demagnetized remanent magnetic stable-states produced in said first and second legs by said strobe signal;
read signal means for selectively inductively coupling to each of said third legs in said first magnetic sense a saturating read signal for placing the flux in the associated first, second and third legs back into their initial negative substantially-saturated remanent magnetic stable-state;
said read signal causing a signal representative of the unbalance in the substantially demagnetized remanent magnetic stable-state of said strobe signal as effected by said sampled portion of said transient signal to be coupled to said corresponding output means.

10. A magnetic memory device, comprising:
a plurality of magnetizable memory elements each having at least two apertures forming first and second equal paths each defined by the peripheral paths about each of said first and second apertures, respectively;
said first and second flux paths having a substantially rectangular hysteresis characteristic and being capable of being operated in a time-limited, an amplitude-limited or a saturated condition as a function of a magnetic field of a predetermined amplitude-duration characteristic;
a first leg common to said first and second flux paths;
a second leg common to only said first flux path;
a third leg common to only said second flux path;
said first, second and third legs forming first and second junctions at first and second ends of said first leg;
read signal means for inductively coupling to all of said first legs in a first magnetic sense an amplitude-limited read signal for placing all of said first, second and third legs in initial negative remanent magnetic stable-states;
strobe signal means for simultaneously inductively coupling to all of said first legs in a second magnetic sense, opposite to the first magnetic sense of said read signal, a constant current source time-limited relatively short duration strobe signal;
said strobe signal having a sufficient amplitude-duration characteristic to cause said first, second and third legs to be moved into substantially-demagnetized remanent magnetic stable-states from said initial negative remanent magnetic stable-state;
transient signal means for inductively coupling to said first junctions at a plurality of delay times with respect to said strobe signal a constant current source relatively long duration transient signal that is additive in one of said first or second legs to the field produced by said strobe signal and subtractive in the other of said first or second legs to the field produced by said strobe signal;

said transient signal having an insufficient amplitude-duration characteristic to substantially effect the magnetic states of said first, second and third legs when in said initial negative remanent magnetic stable-state;

said strobe signal concurrent with a plurality of sampled portions of said transient signal, each sampled portion corresponding to the respective transient signal delay time;

separate output means inductively coupled to said second junction of each element;

said concurrent strobe signal and said transient signal sampled portion causing a flux unbalance in the remanent magnetic stable-states of said second and third legs;

said read signal means selectively coupling said read signal to said first legs, for placing said first, second and third legs back into their initial negative remanent magnetic stable-states;

said read signal causing an output signal representative of the flux unbalance in said second and third legs of each element to be coupled to its respective output means.

11. A magnetic device, comprising:

a plurality of magnetizable memory elements each having three parallel arranged legs joined at first and second junctions;

each of said legs forming closed flux paths with each other and having a substantially rectangular hysteresis characteristic and being capable of being operated in a time-limited, an amplitude-limited or a saturated condition as a function of a magnetic field of a predetermined amplitude-duration characteristic;

first and second of said legs each forming equal flux paths with said third leg;

read signal means for inductively coupling to the said third legs of said elements in a first magnetic sense an amplitude-limited read signal for placing said first, second and third legs in initial negative remanent magnetic stable-states;

strobe signal means for simultaneously inductively coupling to the said third legs of all of said elements in a second magnetic sense, opposite to said read signal, a constant-current source time-limited relatively short duration strobe signal;

said strobe signal having a sufficient amplitude-duration characteristic to cause said first, second and third legs to be placed into a substantially-demagnetized remanent magnetic stable-state from said initial stable-state;

transient signal means for selectively inductively coupling a constant-current source relatively long duration transient signal to said first junctions at a plurality of different delay times with respect to said strobe signal;

said transient signal having an insufficient amplitude-duration characteristic to effect the initial stable-states of said first, second and third legs;

said stroke signal concurrent with a plurality of sampled portions of said transient signal, each sampled portion corresponding to the respective transient signal delay time;

separate output means inductively coupled to said second junction of each element;

said transient signal sampled portion causing an unbalance representative of its polarity and amplitude from the flux levels of the substantially-demagnetized stable-states of said first and second legs of the respective element;

said read signal means selectively coupling said read signal to said third leg of a selected one of said elements;

said read signal causing an output signal representative of the flux level unbalance in said first and second legs of each element to be coupled to its respective output means.

12. A magnetic memory device, comprising:

a plurality of multi-apertured magnetizable memory elements each having a substantially rectangular hysteresis characteristic and being capable of being operated in a time-limited, an amplitude-limited or a saturated condition as a function of a magnetic field of a predetermined amplitude-duration characteristic;

each element having at least two apertures;

first and second equal flux paths each defined by the peripheral paths about each of said first and second apertures, respectively;

a third flux path defined by the peripheral path about both of said first and second apertures;

a first leg common to said first and third flux paths;

a second leg common to said second and third flux paths;

a third leg common to said first and second flux paths;

said first, second and third legs forming first and second junctions at first and second ends of said third leg;

read signal means for selectively inductively coupling to the third leg of each element in a first magnetic sense an amplitude-limited read signal for placing the flux in said first, second and third legs in an initial negative remanent magnetic stable-state;

strobe signal means for inductively coupling to said third leg in a second magnetic sense, opposite to said first magnetic sense of said read signal, a constant current source time-limited relatively short duration strobe signal;

said strobe signal having a sufficient amplitude-duration characteristic to cause said first, second and third legs to be set into a substantially-demagnetized remanent magnetic stable-state from said initial negative remanent magnetic stable-state;

transient signal means for inductively coupling in a first magnetic sense a plurality of similar constant current source relatively long duration transient signals, each signal coupled to a separate one of said first junctions of each of said elements at a unique delay time with respect to said strobe signal;

said transient signal having an insufficient amplitude-duration characteristic to effect the magnetic state of said first, second and third legs when in said initial negative substantially-saturated remanent magnetic stable-state;

said strobe signal concurrent with a relatively short duration sampled portion of said transient signals;

separate output means inductively coupled to each of said third flux paths at said second junction for detecting a change in the flux level of said third flux path;

said concurrent sampled portion of said transient signal causing an unbalance in the substantially-demagnetized remanent magnetic stable-states produced in said first and second legs by said strobe signal;

said read signal means selectively coupling said read signal to a selected one of said third legs for placing the flux in the associated first, second and third legs back into their initial negative remanent magnetic stable-state;

said read signal causing a signal representative of the unbalance in the substantially demagnetized remanent magnetic stable-state caused by said strobe signal and as affected by said sampled portion of said transient signal to be coupled to said corresponding output means.

13. The method of operating a magnetizable memory element having three parallel arranged legs joined at first and second junctions, each of said legs forming closed flux paths with each other and having a substantially rectangular hysteresis characteristic and being capable of being operated in a time-limited, an amplitude-limited or a saturated condition as a function of a magnetic field of a predetermined amplitude-duration characteristic, first and second of said legs each forming equal flux paths with said third leg, comprising the steps of:

inductively coupling a saturating clear signal to said third leg in a first magnetic sense for placing said first, second and third legs in initial negative substantially-saturated remanent magnetic stable-states;

inductively coupling a constant-current source relatively long duration transient signal to said first junction, said transient signal having an insufficient amplitude-duration characteristic to effect the initial stable-state of said first, second or third legs;

inductively coupling to said third leg in a second magnetic sense, opposite to said clear signal, a constant-current source amplitude-limited relatively short duration strobe signal concurrent with a sampled portion of said transient signal, said strobe signal having a sufficient amplitude-duration characteristic to cause said first, second and third legs to be placed into a substantially-demagnetized remanent magnetic stable-state from said initial stable-state, said transient signal concurrent sampled portion causing an unbalance representative of its polarity and amplitude in the flux levels of the stable-states of said first and second legs;

inductively coupling to said third leg in the same magnetic sense as said clear signal a saturating read signal, said read signal causing an output signal representative of the flux level unbalance in said first and second legs to be coupled to an output means which is inductively coupled to said second junction.

14. The method of operating a magnetizable memory element having at least two apertures forming first and second equal flux paths each defined by the peripheral paths about each of said first and second apertures, respectively, said first and second flux paths having a substantially rectangular hysteresis characteristic and being capable of being operated in a time-limited, an amplitude-limited or a saturated condition as a function of a magnetic field of a predetermined amplitude-duration characteristic, wherein said element has a first leg common to said first and second flux paths, a second leg common to only said first flux path, a third leg common to only said second flux path, and said first, second and third legs form first and second junctions at first and second ends of said first leg, comprising the steps of:

inductively coupling to said first leg in a first magnetic sense a saturating clear field for placing said first, second and third legs in initial negative substantially-saturated remanent magnetic stable-states;

inductively coupling to said first leg in a second magnetic sense, opposite to the first magnetic sense of said clear field, a constant current source time-limited relatively short duration strobe field, said strobe field having a sufficient amplitude-duration characteristic to cause said first, second and third legs to be moved into substantially-demagnetized remanent magnetic stable-states from said initial negative substantially-saturated remanent magnetic stable-states;

inductively coupling to said first junction concurrent with said stroke field a constant current source relatively long duration transient field having a sampled portion that is additive in one of said first or second legs to said stroke field and subtractive in the other of said first or second legs to said stroke field, said transient field having an insufficient amplitude-duration characteristic to substantially effect the magnetic states of said first, second and third legs when in said initial negative substantially-saturated remanent magnetic stable-state, said concurrent stroke field and said transient field sampled portion causing a flux unbalance in the remanent magnetic stable-states of said second and third legs;

inductively coupling to said first leg in the said first magnetic sense of said clear field a saturating read field for placing said first, second and third legs back into their initial negative substantially-saturated remanent magnetic stable-states;

said read field causing an output field in the area of said second junction which is representative of the flux unbalance in said second and third legs.

15. The method of operating a multi-aperture magnetizable memory element having a substantially rectangular hysteresis characteristic and being capable of being operated in a time-limited, an amplitude-limited or a saturated condition as a function of a magnetic field of a predetermined amplitude-duration characteristic wherein said element has at least two apertures forming first and second equal flux paths each defined by the peripheral paths about each of said first and second apertures, respectively, and a third flux path defined by the peripheral path about both of said first and second apertures, said paths having a first leg common to said first and third flux paths, a second leg common to said second and third flux paths, a third leg common to said first and second flux paths, and said first, second and third legs forming first and second junctions at first and second ends of said third leg, comprising:

inductively coupling a saturating clear signal to said third leg in a first magnetic sense for placing the flux in said first, second and third legs in an initial negative substantially-saturated remanent magnetic stable-state;

inductively coupling in a first magnetic sense a constant current source relatively long duration transient signal to said first junction, said transient signal having an insufficient amplitude-duration characteristic to effect the magnetic state of said first, second and third legs when in said initial negative substantially-saturated remanent magnetic stable-state;

inductively coupling to said third leg in a second magnetic sense, opposite to the first magnetic sense of said clear signal, a constant current source time-limited relatively short duration strobe signal concurrent with a relatively short duration sampled portion of said transient signal, said strobe signal having a sufficient amplitude-duration characteristic to cause said first, second and third legs to be set into a substantially-demagnetized remanent magnetic stable-state from said initial negative substantially-saturated remanent magnetic stable-state, said concurrent sampled portion of said transient signal causing an unbalance in the substantially-demagnetized remanent magnetic stable-states produced in said first and second legs by said strobe signal;

inductively coupling to said third leg in said first magnetic sense a saturating read signal for placing the flux in said first, second and third legs back into their initial negative substantially-saturated remanent magnetic stable-state;

said read signal causing an output signal which is representative of the unbalance in the substantially demagnetized remanent magnetic stable-state caused by said strobe signal as effected by said sampled portion of said transient signal, said output signal generated in an output means by the change in the flux level in said third flux path in the area of said second junction.

16. The method of operating a magnetizable memory element having three parallel arranged legs joined at first and second junctions, each of said legs forming closed flux paths with each other and having a substantially rectangular hysteresis characteristic and being capable of being operated in a time-limited, an amplitude-limited or a saturated condition as a function of a magnetic field of a predetermined amplitude-duration characteristic, first and second of said legs each forming equal flux paths with said third leg, comprising the steps of:

inductively coupling an amplitude-limited read signal to said third leg in a first magnetic sense for placing said first, second and third legs in initial negative substantially-saturated remanent magnetic stable-states;

inductively coupling a constant-current source relatively long duration transient signal to said first junction, said transient signal having an insufficient amplitude-duration characteristic to effect the initial stable-state of said first, second or third legs;

inductively coupling to said third leg in a second magnetic sense, opposite to said read signal, a constant-current source amplitude-limited relatively short duration strobe signal concurrent with a sampled portion of said transient signal, said strobe signal having a sufficient amplitude-duration characteristic to cause said first, second and third legs to be placed into a substantially-demagnetized remanent magnetic stable-state from said initial stable-state, said transient signal concurrent sampled portion causing an unbalance representative of its polarity and amplitude in the flux levels of the stable-states of said first and second legs;

inductively coupled to said third leg in the same magnetic sense as said read signal a saturating read signal, said read signal causing an output signal representative of the flux level unbalance in said first and second legs to be coupled to an output means which is inductively coupled to said second junction.

17. The method of operating a magnetizable memory element having at least two apertures forming first and second equal flux paths each defined by the peripheral paths about each of said first and second apertures, respectively, said first and second flux paths having a substantially rectangular hysteresis characteristic and being capable of being operated in a time-limited, an amplitude-limited or a saturated condition as a function of a magnetic field of a predetermined amplitude-duration characteristic, wherein said element has a first leg common to said first and second flux paths, a second leg common to only said first flux path, a third leg common to only said second flux path, and said first, second and third legs form first and second junctions at first and second ends of said first leg, comprising the steps of:

inductively coupling to said first leg in a first magnetic sense an amplitude-limited read field for placing said first, second and third legs in initial negative remanent magnetic stable-states;

inductively coupling to said first leg in a second magnetic sense, opposite to the first magnetic sense of said read field, a constant current source time-limited relatively short duration strobe field, said strobe field having a sufficient amplitude-duration characteristic to cause said first, second and third legs to be moved into substantially-demagnetized remanent magnetic stable-states from said initial negative remanent magnetic stable-states;

inductively coupling to said first junction concurrent with said strobe field a constant current source relatively long duration transient field having a sampled portion that is additive in one of said first or second legs to said strobe field and subtractive in the other of said first or second legs to said strobe field, said transient field having an insufficient amplitude-duration characteristic to substantially effect the magnetic states of said first, second and third legs when in said initial negative remanent magnetic stable-state, said concurrent strobe field and said transient field sampled portion causing a flux unbalance in the remanent magnetic stable-states of said second and third legs;

inductively coupling to said first leg said read field for placing said first, second and third legs back into their initial negative remanent magnetic stable-states;

said read field causing an output field in the area of said second junction which is representative of the flux unbalance in said second and third legs.

18. The method of operating a multi-aperture magnetizable memory element having a substantially rectangular hysteresis characteristic and being capable of being operated in a time-limited, an amplitude limited or a saturated condition as a function of a magnetic field of a predetermined amplitude-duration characteristic wherein said element has at least two apertures forming first and second equal flux paths each defined by the peripheral paths about each of said first and second apertures, respectively, and a third flux path defined by the peripheral path about both of said first and second apertures, said paths having a first leg common to said first and third flux paths, a second leg common to said second and third flux paths, a third leg common to said first and second flux paths, and said first, second and third legs forming first and second junctions at first and second ends of said third leg, comprising:

inductively coupling an amplitude-limited read signal to said third leg in a first magnetic sense for placing the flux in said first, second and third legs in an initial negative amplitude-limited remanent magnetic stable-state;

inductively coupling in a first magnetic sense a constant current source relatively long duration transient signal to said first junction, said transient signal having an insufficient amplitude-duration characteristic to effect the magnetic state of said first, second and third legs when in said initial negative amplitude-limited remanent magnetic stable-state;

inductively coupling to said third leg a second magnetic sense, opposite to the said first magnetic sense of said read signal, a constant current source time-limited relatively short duration strobe signal concurrent with a relatively short duration sampled portion of said transient signal, said strobe signal having a sufficient amplitude-duration characteristic to cause said first, second and third legs to be set into a substantially-demagnetized remanent magnetic stable-state from said initial negative amplitude-limitetd remanent magnetic stable-state, said concurrent sampled portion of said transient signal causing an unbalance in the substantially-demagnetized remanent magnetic stable-states produced in said first and second legs by said strobe signal;

inductively coupling to said third leg in said first magnetic sense said read signal for placing the flux in said first, second and third legs back into their initial negative amplitude-limited remanent magnetic stable-state;

said read signal causing an output signal which is representative of the unbalance in the substantially demagnetized remanent magnetic stable-state caused by said strobe signal as effected by said sampled portion of said transient signal, said output signal generated in an output means by the change in the flux level in said third flux path in the area of said second junction.

References Cited

UNITED STATES PATENTS 3,213,435 10/1965 Bruce ______________ 340—174
3,287,712 11/1966 Hewitt ______________ 340—174

BERNARD KONICK, *Primary Examiner.*
S. M. URYNOWICZ, *Assistant Examiner.*

UNITED STATES PATENT OFFICE
CERTIFICATE OF CORRECTION

Patent No. 3,332,073 July 18, 1967

Fred G. Hewitt

It is hereby certified that error appears in the above numbered patent requiring correction and that the said Letters Patent should read as corrected below.

Column 1, line 33, for "means" read -- mean --; column 3, line 6, before "path" insert -- flux --; column 4, line 44, for "fluid" read -- field --; column 5, line 8, for "fore" read -- force --; column 6, line 38, for "$\phi$1" read -- $\phi_1$ --; column 7, line 17, for "$S_W$" read -- Sw --; same line 17, for "$S_W\prime$" read -- Sw′ --; line 66, for "it" read -- is --; column 14, line 7, for "stroge" read -- strobe --; line 51, strike out "and subtractive in the other of" and insert instead -- means for inductively coupling to --; column 21, lines 63, 66, 67 and 72, for "stroke", each occurrence, read -- strobe --; column 24, line 45, for "limitetd" read -- limited --.

Signed and sealed this 30th day of July 1968.

(SEAL)
Attest:

EDWARD M.FLETCHER,JR.
Attesting Officer

EDWARD J. BRENNER
Commissioner of Patents